United States Patent [19]
Collins, Sr.

[11] 3,849,928
[45] Nov. 26, 1974

[54] ANTI-SNAG FISH LURE

[76] Inventor: Burl T. Collins, Sr., 2802 E. Pearl St., Sioux Falls, S. Dak. 57103

[22] Filed: Apr. 29, 1974

[21] Appl. No.: 465,065

[52] U.S. Cl. .......... 43/37, 43/42.04, 43/42.41, 43/43.4
[51] Int. Cl. .......... A01k 83/00, A01k 85/00
[58] Field of Search .......... 43/42.05, 42.04, 42.1, 43/42.41, 42.4, 37, 34, 43.4

[56] References Cited
UNITED STATES PATENTS

| | | | |
|---|---|---|---|
| 1,702,074 | 2/1929 | Comstock | 43/42.4 |
| 2,981,027 | 4/1961 | Dewyer | 43/42.1 |
| 3,170,756 | 2/1965 | Butler | 43/43.4 |
| 3,815,274 | 6/1974 | Schleif | 43/43.4 |

*Primary Examiner*—Warner H. Camp

[57] ABSTRACT

An anti-snag fish lure having a housing which completely encloses a fishing hook as it is pulled through the water in a trolling or retrieving activity, with the hook moving to an exposed position relative to the housing when a striking fish bites the lure so as to be engaged deeply within the fish's mouth, the lure having wing like projections so that the lure may dive, flutter, or bob while being pulled through the water.

4 Claims, 6 Drawing Figures

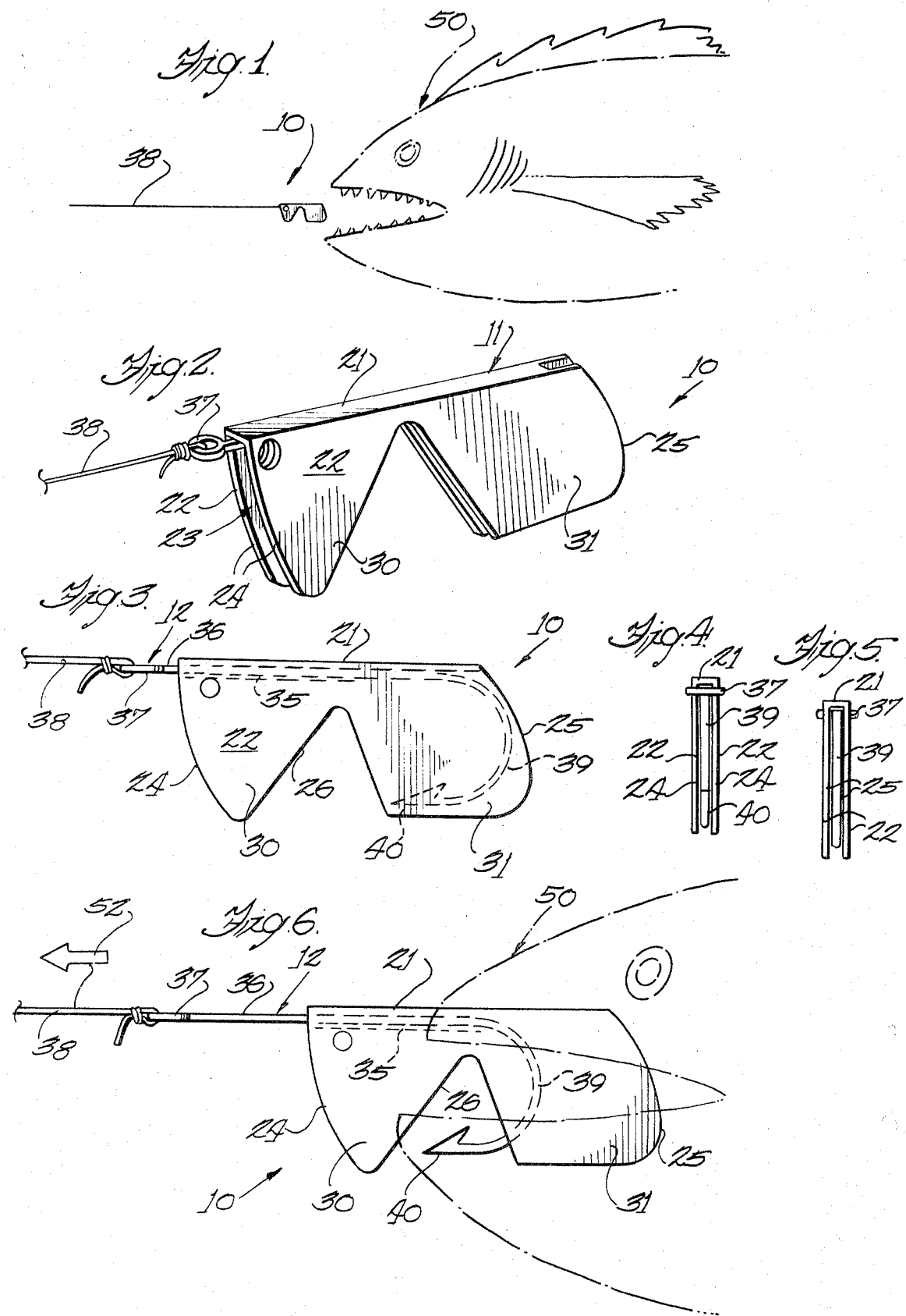

ANTI-SNAG FISH LURE

BACKGROUND OF THE INVENTION

1. Field of the Invention

This invention relates generally to fishing lures and more particularly to an anti-snag fishing lure in which the hook is guarded against snagging on foreign matter in the fishing waters such as weeds, logs, and the like.

2. Description of the Prior Art

The sport of fishing is constantly increasing in popularity due to its being performed by individuals of both sexes and of a wide range of ages. However, one of the most frustrating problems common to many fishermen is that of the fishing hook or lure constantly snagging on foreign material in the fishing water, such as weeds, logs, or other underwater obstructions. This commonly results in loss of the lure since it frequently cannot be adequately retrieved by the fisherman after being so snagged. This is thus frustrating to the fisherman as well as consuming considerable time of the fisherman in his efforts to free the lure for re-use.

In view of this problem, lures of various configurations have been developed in the prior art which attempt to provide anti-snag protection for the lure, but such lures suffer from one or more disadvantages as to being overly complex to manufacture and expensive to purchase, subject to erratic operation, perform in an unattractive manner to potential striking fish, and the like. Among such lures are those where the fish hooks are spring biased in a manner to spring outwardly from the lure body when bit by a striking fish, those using rubbery masses with the hooks embedded therein and which are exposed upon a fish biting the lure, and the like.

Examples of prior art fishing lures are found in the U.S. Pat. Nos. 2,651,876; 2,563,386; 2,569,642; and 2,580,733.

SUMMARY OF THE INVENTION

The present invention recognizes the problem of snagging of fishing lures encountered by fishermen in fishing waters, and provides a novel solution thereto which not only solves the problem but also remedies and overcomes all of the deficiencies and disadvantages of presently available fishing lures. The fishing lure of the present invention provides a single hook slidable longitudinally in a metal housing such that the hook is completely enclosed in a snag-free manner by the housing with the barbed end of the hook being exposed from the housing instantaneously upon a striking fish biting the lure housing.

It is a feature of the present invention to provide an improved fishing lure which will not snag on underwater obstructions, such as weeds, as the lure is pulled through the fishing waters in a trolling or retrieving activity.

A further feature of the present invention provides an anti-snag fish lure having a configuration such that the lure may dive, flutter, or bob while being pulled through the water in a manner attractive to potential striking fish.

Among further features and advantages of the present invention is the provision of a fish lure which is relatively simple in its construction and which therefore may be readily manufactured at a relatively low cost and by simple manufacturing methods; one which is possessed of few parts and which therefore is unlikely to get out of order; one which is of a rugged and durable construction and which therefore may be guaranteed by the manufacturer to operate in the intended manner; one which is easy to use and reliable and efficient in operation; one which can be retailed at a sufficiently low price to encourage its widespread use; and one which is otherwise well adapted to perform the services required of it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a side elevational view of a fishing lure of the present invention being pulled through the water and a striking fish approaching the same;

FIG. 2 is a perspective view of the fish lure of the present invention;

FIG. 3 is a side elevational view of the fish lure;

FIG. 4 is a front elevational view of the fish lure;

FIG. 5 is a rear elevational view of the fish lure; and

FIG. 6 is a side elevational view of the fish lure similar to FIG. 3 but with a striking fish biting on the lure and the fish hook thus moved to an exposed position to engage the mouth of the striking fish.

DESCRIPTION OF THE PREFERRED EMBODIMENT

Referring now to the drawings in detail there is illustrated a preferred form of an anti-snag fish lure constructed in accordance with the principles of the present invention and designated generally in its entirety by the reference numeral 10, the fish lure comprised of two component parts, namely a housing or body member 11 and a single fishing hook 12.

The body 11 is of a generally U-shape vertical cross-section configuration having a horizontal flat bight top surface 21 and identical transversely spaced apart juxtapositioned side wall surfaces 22 defining a channel 23 extending longitudinally therebetween. Each of the side wall surfaces 22 has an arcuate front edge 24, an arcuate back edge 25, and an inverted vertically extending V-shaped opening 26 disposed adjacent the front edge and spaced a distance from the back edge. The V-shaped opening 26 divides each of the side walls into wing like members 30 and 31.

Disposed along the base of wing-like member 30 adjacent the interior surface of top surface 21 is a cylindrically shaped passageway 35 of a diameter adapted to receive freely therethrough the shank portion 36 of fish hook 12 having an eyelet 37 at one end thereof for tying a leader 38 thereto and having a curved hook end 39 at the opposite end thereof which curves about and terminates in a barbed end 40. As noted in the drawings the curved portion 39 and barbed end 40 are completely contained within wing 31 when the hook is inserted in channel 23.

The configuration of the wings is such that the lure may dive, flutter or bob while being pulled through the water in a manner attractive to potential striking fish, such as a striking fish designated by reference numeral 50 in FIG. 1.

The body 11 completely encloses the hook 39 and barb end 40 as the lure 10 is pulled through the water in a trolling or retrieving activity so as to prevent the hook from snagging on underwater obstructions, such as weeds, logs, and the like and thus avoiding inadvertent loss of the lure which might otherwise occur due to such snagging. When the striking fish bites the lure, the additional tension or pull on leader 38 caused by the biting fish effects the instantaneous longitudinal movement of hook 12 in channel 23 relative to body 11 such that the barbed end 40 projects into the V-shaped opening 26 to expose the barbed end and engage the mouth of the fish, this being as illustrated in FIG. 6 with the movement of the hook relative to the body being designated generally by arrow 52. This forward movement of the hook 12 relative to body 11 is terminated when curved portion 39 engages the innermost end of passageway 35 which properly positions the barbed end 40 in opening 26.

After the fish is caught and removed from the water, it is possible to remove the barbed end 40 from the fish's mouth by pulling forward on wings 30 until eyelet 37 abuts front edge 24 to return the barbed end between the wings 31 and effect the simultaneous removal of the hook from the fish's mouth.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. An anti-snag fishing lure comprising a longitudinally extending body member having a substantially inverted U-shaped cross-sectional configuration having a bight portion and opposed leg portions, a channel defined longitudinally between said leg portions, a slot extending vertically through each of said leg portions to define a front wing member and a back wing member in each leg portion, a fishing hook having a shank and a curved end portion terminating in a barbed terminal end, said fishing hook disposed in said channel with said shank extending longitudinally along an interior surface of said bight portion, said curved portion and terminal barbed end being completely enclosed between said back wing leg portions, and said fish hook being slidable longitudinally of said body between an inoperative position where the fish hook is completely enclosed in said body and an operative position where the barbed terminal end projects out of the body member into said slot for engagement with the mouth of a fish to capture the same.

2. The fish lure as set forth in claim 1 wherein said bight portion defines a longitudinally extending horizontally disposed top surface, said leg portions define vertically disposed transversely spaced apart juxtapositioned identical side wall surfaces, said slot is of an inverted V-shaped configuration, said back wing is of a longitudinally greater length than said front wing to completely enclose said curved end and terminal barbed end of said fish hook in said channel defined therebetween, the front edge of each side wall being arcuately shaped, the back edge of each side wall being arcuately shaped, and said channel extending completely through said body member.

3. The fishing lure as set forth in claim 2 further characterized by a cylindrically shaped passageway disposed in said front wing portion of said channel immediately adjacent an interior surface of said top bight surface and being of a size and configuration to slidingly receive said shank portion of said fish hook therein, said passageway terminating at a position inwardly of said body member substantially adjacent the vertex end of said V-shaped opening such that the forward movement of said fish hook relative to said body member is terminated at the point where said curved fish hook portion engages the inner end of said passageway with this position properly positioning said barbed end of said fish hook in said V-shaped opening for engagement with the mouth of a fish.

4. The fishing lure as set forth in claim 3 further characterized by the eyelet end of said fish hook shank extending normal to the plane of the fish hook defined by the shank and curved portion thereof, said eyelet having a transverse dimension greater than the width of said channel and adapted to engage said front edge surfaces of said front wing members to properly position said curved end portion and said barbed end of said fish hook in said body member.

* * * * *